United States Patent
Wu et al.

(10) Patent No.: US 10,742,379 B2
(45) Date of Patent: Aug. 11, 2020

(54) UPLINK CONTROL INFORMATION HANDLING FOR NEW RADIO

(71) Applicant: MEDIATEK INC., Hsinchu (TW)

(72) Inventors: Wei-De Wu, Hsinchu (TW); Hung-Chi Kuo, Hsinchu (TW); Xiu-Sheng Li, Hsinchu (TW); Yuan-Hwui Chung, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 16/243,354

(22) Filed: Jan. 9, 2019

(65) Prior Publication Data

US 2019/0222387 A1    Jul. 18, 2019

Related U.S. Application Data

(60) Provisional application No. 62/620,505, filed on Jan. 23, 2018, provisional application No. 62/616,528, filed on Jan. 12, 2018.

(51) Int. Cl.
*H04L 5/00* (2006.01)
*H04W 72/04* (2009.01)
*H04W 84/04* (2009.01)

(52) U.S. Cl.
CPC .......... *H04L 5/0051* (2013.01); *H04L 5/0046* (2013.01); *H04L 5/0053* (2013.01);
(Continued)

(58) Field of Classification Search
CPC ..... H04L 5/0053; H04L 5/0007; H04L 47/10; H04L 47/30; H04L 47/11; H04L 47/12;
(Continued)

(56) References Cited

U.S. PATENT DOCUMENTS

2011/0274043 A1    11/2011    Nam et al. .............. 370/328
2011/0274062 A1*   11/2011    Cheng ............ H03M 13/13
                                                  370/329
(Continued)

FOREIGN PATENT DOCUMENTS

CN    101533092 A    9/2009
CN    102884742 A    1/2013
(Continued)

OTHER PUBLICATIONS

International Search Report and Written Opinion of International Search Authority for PCT/CN2019/071295 dated Apr. 2, 2019 (9 pages).

(Continued)

*Primary Examiner* — Brenda H Pham
(74) *Attorney, Agent, or Firm* — Imperium Patent Works; Zheng Jin

(57) ABSTRACT

A method of uplink control information (UCI) transmission over physical uplink control channel (PUCCH) is proposed. The UCI may include different information and being transmitted using different PUCCH formats. Under certain scenarios, the coded UCI bitstream size may not be assigned to an integer number of modulated symbols. To eliminate unnecessary processing as well as to utilize every bit in a modulated resource element, it is proposed to adjust the UCI codeword size to be a multiple of PUCCH modulation order.

18 Claims, 3 Drawing Sheets

(52) U.S. Cl.
CPC ....... *H04W 72/0413* (2013.01); *H04L 5/0057* (2013.01); *H04W 84/042* (2013.01)

(58) Field of Classification Search
CPC ............. H04L 2012/5631; H04L 47/15; H04L 47/2441; H04L 47/70; H04L 5/0051; H04L 5/0046; H04L 5/0057; H04W 72/0413; H04W 84/042
USPC .......................................... 370/330, 229, 243
See application file for complete search history.

(56) References Cited

U.S. PATENT DOCUMENTS

| | | | |
|---|---|---|---|
| 2013/0039334 A1* | 2/2013 | Han | H04L 5/0007 370/330 |
| 2014/0029573 A1 | 1/2014 | Lee et al. | 370/331 |
| 2014/0219202 A1 | 8/2014 | Kim et al. | 370/329 |
| 2014/0226608 A1 | 8/2014 | Seo et al. | 370/329 |
| 2017/0366380 A1 | 12/2017 | Hwang et al. | |
| 2018/0270011 A1 | 9/2018 | Yang et al. | |

FOREIGN PATENT DOCUMENTS

| | | |
|---|---|---|
| CN | 104753633 A | 7/2015 |
| CN | 103828319 B | 8/2017 |
| EP | 3244563 A1 | 11/2017 |

OTHER PUBLICATIONS

Taiwan IPO, office action for the TW patent application 108101097 (no English translation is available) dated Oct. 29, 2019 (10 pages).

R1-1715288 3GPP TSG RAN WG1 Meeting #90, Samsung et al., "WF on CSI Format Design", Prague, P.R. Czechia, Aug. 21-25, 2017 (5 pages).

R1-1719927 3GPP TSG RAN WG1 Meeting 91, LG Electronics, "UCI on PUSCH and UL Channel Multiplexing for NR", Reno, USA, Nov. 27-Dec. 1, 2017 (17 pages).

* cited by examiner

| | UCI for TX on PUCCH | UCI for encoding | Value of $E_{UCI}$ |
|---|---|---|---|
| 1 | HARQ-ACK | HARQ-ACK | $E_{UCI} = E_{tot}$ |
| 2 | HARQ-ACK, SR | HARQ-ACK | $E_{UCI} = E_{tot}$ |
| 3 | CSI | HARQ-ACK | $E_{UCI} = E_{tot}$ |
| 4 | HARQ-ACK, CSI | HARQ-ACK | $E_{UCI} = E_{tot}$ |
| 5 | HARQ-ACK, SR, CSI | HARQ-ACK | $E_{UCI} = E_{tot}$ |
| 6 | CSI two parts | CSI part 1 | $E_{UCI} = \min\left(E_{tot}, \left\lceil (O^{CSI\text{-}part1} + L)/R_{UCI}^{max}/Q_m \right\rceil \cdot Q_m \right)$ |
| 6 | CSI two parts | CSI part 2 | $E_{UCI} = E_{tot} - \min\left(E_{tot}, \left\lceil (O^{CSI\text{-}part1} + L)/R_{UCI}^{max}/Q_m \right\rceil \cdot Q_m \right)$ |
| 7 | HARQ-ACK, SR, CSI (two parts) | HARQ-ACK, CSI part 1 | $E_{UCI} = \min\left(E_{tot}, \left\lceil (O^{ACK} + O^{CSI\text{-}part1} + L)/R_{UCI}^{max}/Q_m \right\rceil \cdot Q_m \right)$ |
| 7 | HARQ-ACK, SR, CSI (two parts) | CSI part 2 | $E_{UCI} = E_{tot} - \min\left(E_{tot}, \left\lceil (O^{ACK} + O^{CSI\text{-}part1} + L)/R_{UCI}^{max}/Q_m \right\rceil \cdot Q_m \right)$ |
| 8 | HARQ-ACK, SR, CSI (two parts) | HARQ-ACK, SR, CSI part 1 | $E_{UCI} = \min\left(E_{tot}, \left\lceil (O^{ACK} + O^{SR} + O^{CSI\text{-}part1} + L)/R_{UCI}^{max}/Q_m \right\rceil \cdot Q_m \right)$ |
| 8 | HARQ-ACK, SR, CSI (two parts) | CSI part 2 | $E_{UCI} = E_{tot} - \min\left(E_{tot}, \left\lceil (O^{ACK} + O^{SR} + O^{CSI\text{-}part1} + L)/R_{UCI}^{max}/Q_m \right\rceil \cdot Q_m \right)$ |

FIG. 3

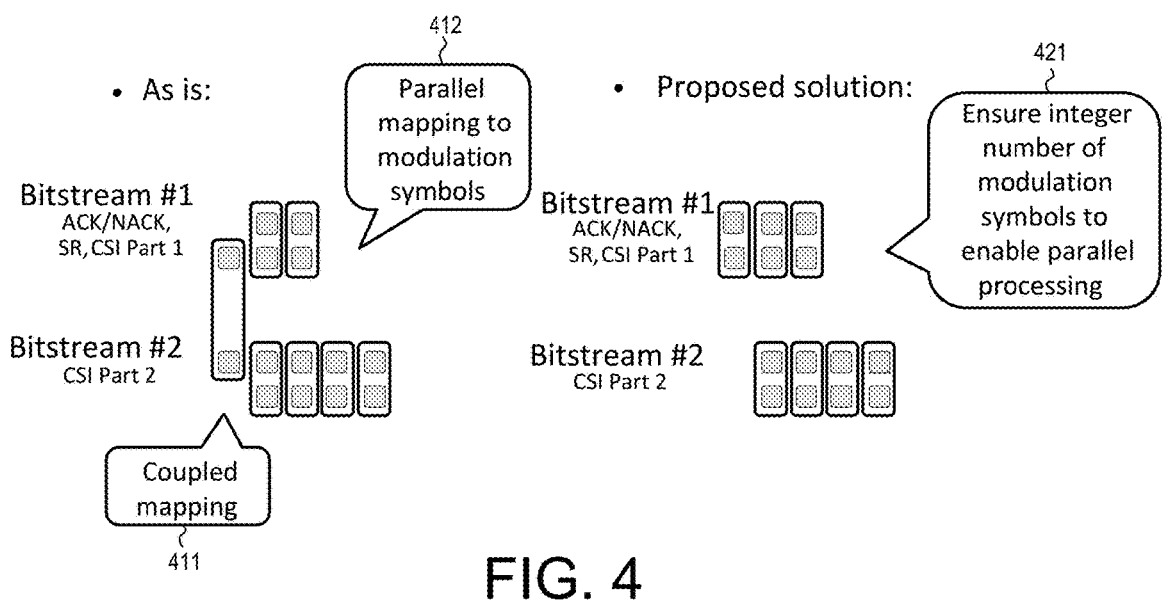

FIG. 4

UPLINK CONTROL INFORMATION HANDLING FOR NEW RADIO

CROSS REFERENCE TO RELATED APPLICATIONS

This application claims priority under 35 U.S.C. § 119 U.S. provisional application 62/616,528 entitled "On NR UL Processing," filed on Jan. 12, 2018; U.S. provisional application 62/620,505 entitled "On NR UL Processing," filed on Jan. 23, 2018, the subject matter of which is incorporated herein by reference.

TECHNICAL FIELD

The disclosed embodiments relate generally to wireless communication, and, more particularly, to method and apparatus for uplink control information (UCI) handling in new radio (NR) systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The Next Generation Mobile Network (NGMN) board, has decided to focus the future NGMN activities on defining the end-to-end requirements for 5G new radio (NR) systems.

Orthogonal Frequency Division Multiple Access (OFDMA) has been selected for LTE/NR downlink (DL) radio access scheme due to its robustness to multipath fading, higher spectral efficiency, and bandwidth scalability. Multiple access in the downlink is achieved by assigning different sub-bands (i.e., groups of subcarriers, denoted as resource blocks (RBs)) of the system bandwidth to individual users based on their existing channel condition. In LTE/NR networks, Physical Downlink Control Channel (PDCCH) is used for downlink scheduling. Physical Downlink Shared Channel (PDSCH) is used for downlink data. Similarly, in the uplink, Physical Uplink Control Channel (PUCCH) is used for carrying uplink control information (UCI). Physical Uplink Shared Channel (PUSCH) is used for uplink data.

In 3GPP LTE/NR systems based on OFDMA, the radio resource is partitioned into subframes or slots in time domain, each subframe/slot consists of a number of OFDM symbols. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. A plurality of REs is grouped into physical resource blocks (PRBs), where each PRB consists of twelve consecutive subcarriers in one slot. In principle, coded UCI bits are assigned to an integer number of modulated REs for PUCCH transmission. However, the UCI codeword size may not be a multiple of PUCCH modulation order. As a result, unnecessary processing at the base station and insertion of dummy bit at the UE side are required.

A solution is sought.

SUMMARY

A method of uplink control information (UCI) transmission over physical uplink control channel (PUCCH) is proposed. The UCI may include different information and being transmitted using different PUCCH formats. Under certain scenarios, the coded UCI bitstream size may not be assigned to an integer number of modulated symbols. To eliminate unnecessary processing as well as to utilize every bit in a modulated resource element, it is proposed to adjust the UCI codeword size to be a multiple of PUCCH modulation order. In one embodiment, the UCI contains a first bitstream for CSI part1 and a second bitstream for CSI part2. The first UCI bitstream is adjusted to have a codeword size of a multiple of PUCCH modulation order. The sum of the first UCI codeword size and the second UCI codeword size is equal to the total codeword size allocated for the PUCCH transmission.

In one embodiment, a UE encodes uplink control information (UCI) in a new radio (NR) network. The UCI is encoded to a first UCI bitstream having a first UCI codeword size and a second UCI bitstream having a second UCI codeword size. The UE adjusts the first UCI bitstream such that the first UCI codeword size is a multiple of a modulation order. The UE modulates and maps the adjusted first UCI bitstream using a modulation scheme having the modulation order onto a plurality of resource elements (REs). The UE transmits the UCI over a physical uplink control channel (PUCCH).

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 3 illustrates UCI transmission over PUCCH carrying different UCI content having different UCI codeword size in NR systems.

FIG. 4 illustrates one embodiment of determining proper UCI codeword size for PUCCH in NR networks in accordance with one novel aspect.

DETAILED DESCRIPTION

Reference will now be made in detail to some embodiments of the invention, examples of which are illustrated in the accompanying drawings.

Figure 1:
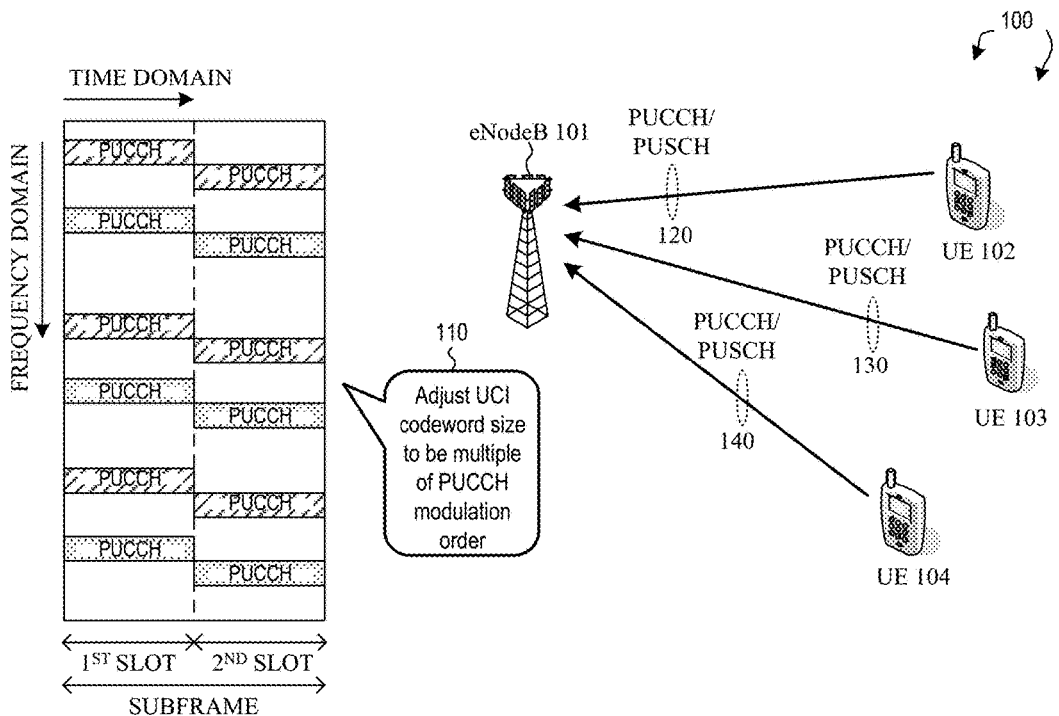
FIG. 1 illustrates a system diagram of a new radio (NR) wireless system with uplink control information (UCI) transmission via physical uplink control channel (PUCCH) in accordance with embodiments of the current invention.

FIG. 1 illustrates a system diagram of a new radio (NR) wireless system with uplink control information (UCI) transmission via physical uplink control channel (PUCCH) in accordance with embodiments of the current invention. Mobile communication network 100 is an OFDM/OFDMA system comprising a base infrastructural unit 101 and a plurality of user equipments UE 102, UE 103, and UE 104. Each base unit forms a wireless radio access network (RAN) distributed over a geographical region. A base unit may also be referred to as an access point (AP), an access terminal, a base station (BS), a Node-B, an eNodeB/eNB, a gNodeB/gNB, or by other terminology used in the art. Each UE may be a smart phone, a wearable device, an Internet of Things (IoT) device, a tablet, and etc. In LTE/NR systems based on OFDMA, the radio resource is partitioned into radio frames and subframes, each of which is comprised of time slots and OFDM symbols in time domain. Each OFDMA symbol further consists of a number of OFDMA subcarriers in frequency domain depending on the system bandwidth. The basic unit of the resource grid is called Resource Element (RE), which spans an OFDMA subcarrier over one OFDMA symbol. REs are grouped into physical resource blocks (PRBs), where each PRB consists of 12 consecutive subcarriers in one slot.

When there is a downlink packet to be sent from eNodeB to UE, each UE gets a downlink assignment, e.g., a set of radio resources in a physical downlink shared channel (PDSCH). When a UE needs to send a packet to eNodeB in the uplink, the UE gets a grant from the eNodeB that assigns a physical uplink shared channel (PUSCH) consisting of a set of uplink radio resources. The UE gets the downlink or uplink scheduling information from a physical downlink control channel (PDCCH) that is targeted specifically to that UE. In addition, broadcast control information is also sent in PDCCH to all UEs in a cell. The downlink or uplink scheduling information and the broadcast control information, carried by PDCCH, is referred to as downlink control information (DCI). The uplink control information (UCI) including Hybrid Automatic ReQuest (HARQ) ACK/NACK, Channel Quality Indicator (CQI), Multiple-Input Multiple-Output (MIMO) feedback, and scheduling requests (SRs). UCI is carried by a physical uplink control channel (PUCCH).

In the example of FIG. 1, PUCCH 120 is allocated for UE 102 for uplink control information. PUCCH 130 is allocated for UE 103 for uplink control information. PUCCH 140 is allocated for UE 104 for uplink control information. PUCCH 120, PUCCH 130, and PUCCH 140 form different radio resource interlace across the entire frequency domain. Similarly, a number of radio resource interlaces over the nominal channel bandwidth with interleaved PRBs may be allocated as PUSCHs to the number of UEs. For UCI transmission over PUCCH, the UCI is first encoded, rate matched, and scrambled. The encoded UCI bits and then modulated to create complex-valued modulation symbols based on various modulation orders. The complex-valued symbols are finally mapped onto corresponding REs of PRBs for OFDM signal transmission.

In principle, the encoded UCI bits are assigned to an integer number of modulated REs for PUCCH transmission, and every bit in a modulated RE should be utilized. However, the UCI codeword size may not be a multiple of PUCCH modulation order. As a result, unnecessary processing at the base station and insertion of dummy bit at the UE side are required. For example, the UE may need to insert a dummy bit before performing modulation, and the base station needs to drop one unspecified bit in the boundary of QPSK RE for correctly decoding the UCI. In accordance with one novel aspect, to eliminate such unnecessary processing as well as to utilize every bit in a modulated RE, it is proposed to adjust the UCI codeword size so that the UCI codeword size is always a multiple of PUCCH modulation order (110).

Figure 2:
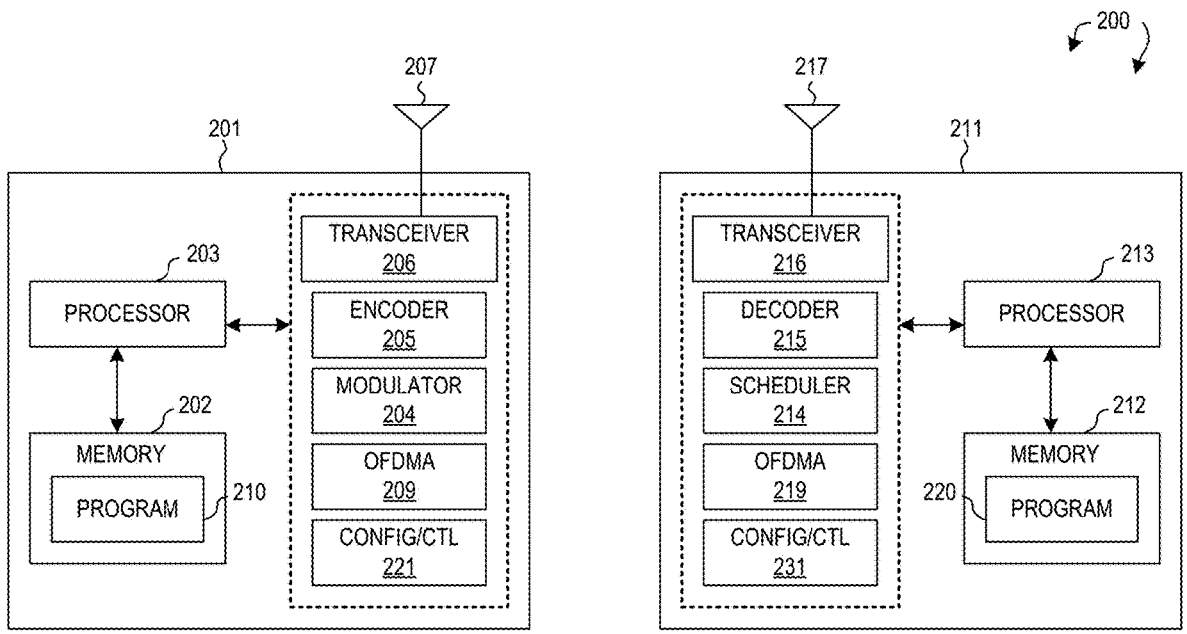
FIG. 2 shows simplified block diagrams of a UE and a BS in accordance with embodiments of the current invention.

FIG. 2 shows simplified block diagrams of wireless devices, e.g., UE 201 and base station 211 in accordance with the current invention. Base station 211 has an antenna or an antenna array 217, which transmits and receives radio signals. A RF transceiver module 216, coupled with the antenna, receives RF signals from antenna 217, converts them to baseband signals and sends them to processor 213. RF transceiver 216 also converts received baseband signals from processor 213, converts them to RF signals, and sends out to antenna 217. Processor 213 processes the received baseband signals and invokes different functional modules to perform features in base station 211. Memory 212 stores program instructions and data 220 to control the operations of base station 211. In the example of FIG. 2, base station 211 also includes a set of control modules and circuits, such as a decoder and demodulator circuit 215 that decodes and demodulates received OFDM signals, a scheduler 214 that schedulers UE for downlink reception and uplink transmission, an OFDMA module 219 that handles OFDM signal and RE mapping, and a configuration and control circuit 231 that provides coding and modulation parameters.

Similarly, UE 201 has an antenna or an antenna array 207, which transmits and receives radio signals. A RF transceiver module 206, coupled with the antenna or antenna array, receives RF signals from antenna or antenna array 207, converts them to baseband signals and sends them to processor 203. RF transceiver 206 also converts received baseband signals from processor 203, converts them to RF signals, and sends out to antenna or antenna array 207. Processor 203 processes the received baseband signals and invokes different functional circuits and modules to perform features in UE 201. Memory 202 stores program instructions and data 210 to control the operations of UE 201. Suitable processors include but are not limited to, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines.

UE 201 also includes a set of control modules and circuits that carry out functional tasks. These functions can be implemented in software, firmware, hardware, and/or any combinations. The function modules and circuits, when executed by processor 203 (e.g., via executing program code 210), allow UE 201 to perform embodiments of the present invention. A processor in associated with software may be used to implement and configure the functional features of UE 201. For example, an encoder 205 encodes the UCI information bits to codewords, modulator 204 modulates the encoded UCI bits to modulation symbols, OFDMA circuit 209 maps the modulation symbols onto REs to be transmitted as OFDM signals over PUCCH, configuration and control circuit 221 receives configuration information for encoding and modulation parameters and adjusts the UCI bitstream codeword size to be a multiple of the PUCCH modulation order such that the UCI bitstream is mapped to an integer number of modulated REs.

FIG. 3 illustrates UCI transmission over PUCCH carrying different UCI content having different UCI codeword sizes in NR systems. PUCCH carries a set of information called UCI (Uplink Control Information). Depending on what kind of information the UCI in PUCCH carries, PUCCH is classified into various formats, which can be summarized as follows. HARQ-ACK using PUCCH format 1a or 1b. HARQ-ACK using PUCCH format 1b with channel selection. Scheduling Request (SR) using PUCCH format 1. HARQ-ACK and SR using PUCCH format 1a or 1b. Channel Quality Indicator (CQI) using PUCCH format 2. CQI and HARQ-ACK using PUCCH format 2a or 2b for normal cyclic prefix, and using PUCCH format 2 for extended cyclic prefix. PUCCH formation 3 carries longer HARQ-ACK, optionally with SR and Channel State information (CSI) reports. PUCCH format 4 carries longer UCI information bits, including HARQ-ACK, SR (if any) and periodic CSI reports (if any). PUCCH format 5 carries more than one CSI report and SR (if any).

FIG. 3 Table 310 illustrates the UCI codeword size $E_{UCI}$ to be transmitted over PUCCH depending on the UCI content and PUCCH format. For UCI transmission over PUCCH, the UCI is first encoded, rate matched, and scrambled. The encoded UCI bits and then modulated to create complex-valued modulation symbols based on various modulation orders. The complex-valued symbols are finally mapped onto corresponding REs of PRBs for OFDM signal transmission. In principle, the encoded UCI bits are mapped to an integer number of modulated REs for PUCCH transmission. However, the UCI codeword size $E_{UCI}$ may not be a multiple of PUCCH modulation order $Q_m$.

Specifically, the CSI feedback information may consist of two parts, CSI part1 and CSI part2. When the PUCCH is used to carry different CSI parts, the encoded UCI bits are divided into two UCI bitstreams to be transmitted. Each of the UCI bitstream shall be mapped to an integer number of modulated REs separately for PUCCH transmission to allow parallel processing. If the UCI codeword size $E_{UCI}$ for any of the UCI bitstream is not a multiple of PUCCH modulation order $Q_m$, then unnecessary processing at the base station side and insertion of dummy bit at the UE side are required. In accordance of one novel aspect, the UE adjusts the $E_{UCI}$ for each UCI bitstream to be a multiple of PUCCH modulation order $Q_m$.

In the example of FIG. 3 Table 310, eight different UCI transmission scenarios over PUCCH are illustrated. In Table 310, the total codeword size for UCI transmission is represented as $E_{TOT}$, while the UCI codeword size for each bitstream is represented as $E_{UCI}$. For the first five scenarios, $E_{UCI}=E_{TOT}$. For scenarios 6, 7, and 8, the $E_{UCI}$ for UCI bitstream 1 (including CSI part1) and UCI bitstream 2 (including CSI part2) are listed below, respectively:

$$E_{UCI}=\min(E_{tot}, \lceil (O^{CSI-part1}+L)/R_{UCI}^{max}/Q_m \rceil \cdot Q_m)$$

$$E_{UCI}=E_{tot}-\min(E_{tot}, \lceil (O^{CSI-part1}+L)/R_{UCI}^{max}/Q_m \rceil \cdot Q_m)$$

$$E_{UCI}=\min(E_{tot}, \lceil (O^{ACK}+O^{CSI-part1}+L)/R_{UCI}^{max}/Q_m \rceil \cdot Q_m)$$

$$E_{UCI}=E_{tot}-\min(E_{tot}, \lceil (O^{ACK}+O^{CSI-part1}+L)/R_{UCI}^{max}/Q_m \rceil \cdot Q_m)$$

$$E_{UCI}=\min(E_{tot}, \lceil (O^{ACK}+O^{SR}+O^{CSI-part1}+L)/R_{UCI}^{max}/Q_m \rceil \cdot Q_m)$$

$$E_{UCI}=E_{tot}-\min(E_{tot}, \lceil (O^{ACK}+O^{SR}+O^{CSI-part1}+L)/R_{UCI}^{max}/Q_m \rceil \cdot Q_m)$$

Where
$O^{CSI-part1}$ is the size for CSI part1;
$O^{CSI-part2}$ is the size for CSI part2;
$O^{ACK}$ is the size for HARQ-ACK;
$O^{SR}$ is the size for SR;
L is the CRC size;
$R^{max}_{UCI}$ is the rate matching ratio;
$Q_m$ is the modulation order.

For each of the UCI bitstream, the UCI codeword size for each bitstream is adjusted to be a multiple of PUCCH modulation order $Q_m$ by performing an upper ceiling function. For example, in the UCI scenario 6, the first UCI bitstream comprises CSI part1 and the second UCI bitstream comprises CSI part2. The UCI codeword size for the first UCI bitstream is $E_{UCI}=\min(E_{tot}, \lceil (O^{CSI-part1}+L)/R_{UCI}^{max}/Q_m \rceil \cdot Q_m)$, and the UCI codeword size for the second UCI codeword size is $E_{UCI}=E_{tot}-\min(E_{tot}, \lceil (O^{CSI-part1}+L)/R_{UCI}^{max}/Q_m \rceil \cdot Q_m)$. The sum of the first UCI codeword size and the second UCI codeword size is always equal to the total codeword size $E_{TOT}$ allocated for the UCI transmission over PUCCH.

FIG. 4 illustrates one embodiment of determining proper UCI codeword size for PUCCH in NR networks in accordance with one novel aspect. Consider PUCCH format 3, where UCI includes HARQ-ACK and CSI with both CSI part1 and CSI part2. If $N^{PUCCH,3}_{symb,UCI}=12$ (indicating number of OFDM symbols for PUCCH, excluding DMRS symbol), $N^{PUCCH,3}_{PRB}=5$ (indicating frequency range of 5 PRBs in every 12 PUCCH symbol, 5*12 RES of QPSK), $Q_m=2$ (QPSK modulation), $R^{max}_{UCI}=0.35$ (rate matching ratio), and CRC size L=11. If there are two UCI bit streams to be transmitted, then the first Bitstream #1 includes the HARQ-ACK and CSI part1, and the second Bitstream #2 includes CSI part2 as depicted in FIG. 4. In one specific example, Bitstream #1 has a total of 384 information bits of HARQ-ACK+CSI-part1, i.e., $O^{ACK}+O^{CSI-part1}=384$. Bitstream #2 has a total of 72 bits, i.e., $O^{CSI-part2}=72$. After rate matching and CRC error checking, the required UCI codeword size for Bitstream #1=(384+11)/0.35=1129, and the total available codeword size on PUCCH=24*12*5=1440.

As a result, the UCI codeword size on PUCCH with QPSK for Bitstream #1=min(1440, 1129)=1129 (odd number), the UCI codeword size on PUCCH with QPSK for Bitstream #2=1440-1129=311 (odd number). Since the modulation order $Q_m=2$ for QPSK, when the UCI Bitstream #1 having an odd number of bits is modulated onto REs based on QPSK, the number of modulation symbols will not be an integer (e.g., odd/2=non-integer). In the current art, if the UCI codeword size is not a multiple of PUCCH modulation order, then unnecessary processing at the base station and insertion of dummy bit at the UE side are required. In one example, the UE may need to insert a dummy bit before performing modulation, and the base station needs to drop one unspecified bit in the boundary of RE for correctly decoding the UCI. In another example, coupled mapping (411) may be needed in addition to parallel mapping (412) to modulation symbols. For example, the UE may need to pair some bits from Bitstream #1 with some bits from Bitstream #2 and perform coupled mapping for modulation and PUCCH transmission, as depicted by 411. For example, QPSK modulation and mapping needs to take bits from both Bitstream #1 and #2 to generate a targeted total number of QPSK symbols. As a result, QPSK modulation and mapping cannot be performed independently and separately, and the two UCI Bitstreams are coupled together over PUCCH transmission, which introduces additional complexity at the receiver side.

On the other hand, under the proposed UCI transmission scheme, UCI Bitstream #1 is adjusted to contain a multiple of PUCCH modulation order $Q_m$ to ensure integer number of modulation symbols and to enable parallel processing, as depicted by 421. The number of information bits contained in the UCI bitstream $N_{UCI}$ is adjusted by using a ceiling operation, e.g., $E_{UCI}$ is adjusted to be the ceiling of $N_{UCI}$ divided by $Q_m$ and then multiplied by $Q_m$. This way, $E_{UCI}$ is guaranteed to be a multiple of PUCCH modulation order $Q_m$. For QPSK modulation, the modulation order $Q_m=2$. Therefore, the UCI codeword size for each UCI bitstream should be even. For example, if the $E_{UCI}$ of Bitstream #1 before adjustment is an odd number, then it is adjusted and extended by one to be an even number. As a result, the code rate of Bitstream #1 will become lower because of the extended codeword size, and the code rate of Bitstream #2 will become higher because of the reduced codeword size.

Figure 5:
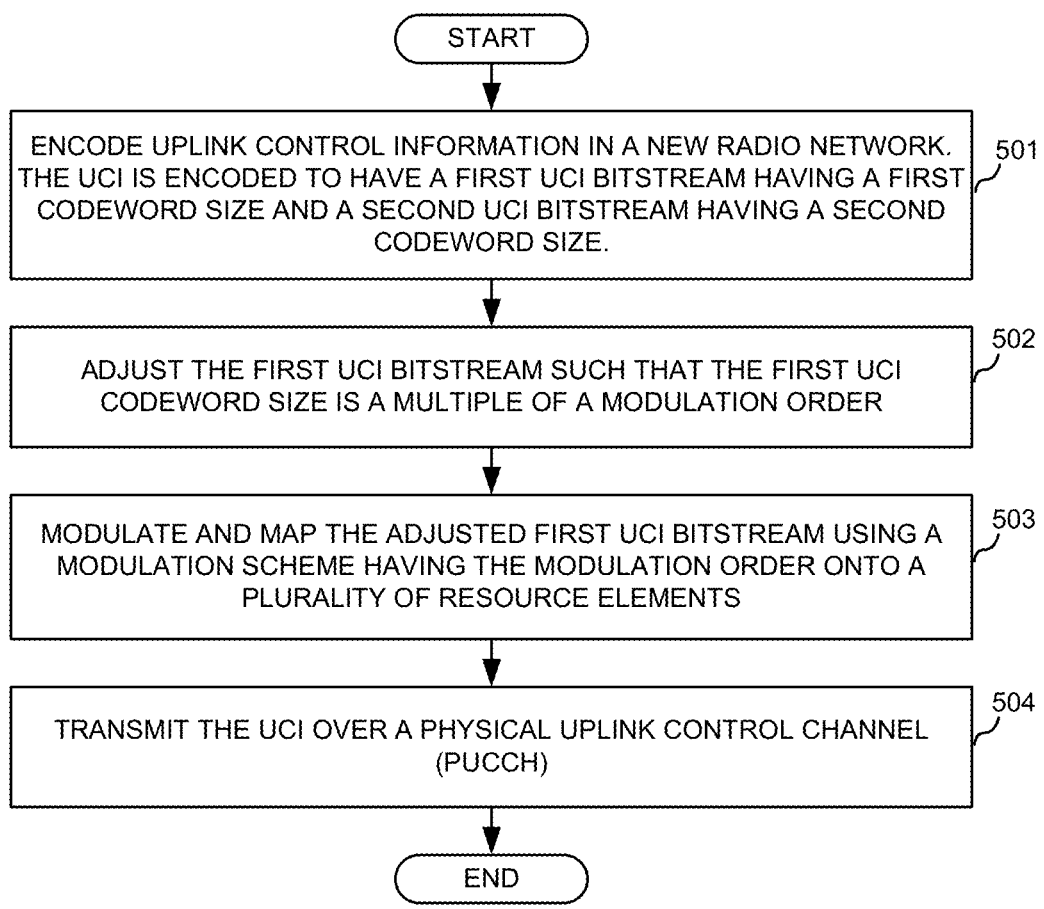
FIG. 5 is a flow chart of a method for UCI transmission over PUCCH in accordance with embodiments of the current invention.

FIG. 5 is a flow chart of a method for UCI transmission over PUCCH in accordance with embodiments of the current invention. In step 501, a UE encodes uplink control information (UCI) in a new radio (NR) network. The UCI is encoded to a first UCI bitstream having a first UCI codeword size and a second UCI bitstream having a second UCI codeword size. In step 502, the UE adjusts the first UCI bitstream such that the first UCI codeword size is a multiple of a modulation order. In step 503, the UE modulates and maps the adjusted first UCI bitstream using a modulation scheme having the modulation order onto a plurality of resource elements (REs). In step 504, the UE transmits the UCI over a physical uplink control channel (PUCCH).

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
    encoding uplink control information (UCI) by a user equipment (UE) in a new radio (NR) network, wherein the UCI is encoded to have a first UCI bitstream having a first UCI codeword size and a second UCI bitstream having a second UCI codeword size;
    adjusting the first UCI bitstream such that the first UCI codeword size is a multiple of a modulation order;
    modulating and mapping the adjusted first UCI bitstream using a modulation scheme having the modulation order onto a plurality of resource elements (REs); and
    transmitting the UCI over a physical uplink control channel (PUCCH).

2. The method of claim 1, wherein the first UCI bitstream comprises a first part of channel state information (CSI) information.

3. The method of claim 1, wherein the second UCI bitstream comprises a second part of channel state information (CSI) information.

4. The method of claim 1, where the first UCI bitstream and the second UCI bitstream are modulated and mapped separately and independently.

5. The method of claim 1, wherein the first UCI codeword size and the second UCI codeword size add up a predefined total size for the PUCCH channel.

6. The method of claim 1, wherein the adjusting of the first UCI bitstream is to ensure an integer number of modulation symbols for the first UCI bitstream.

7. The method of claim 1, wherein the adjusting of the first UCI bitstream is to enable parallel processing between the first UCI bitstream and the second UCI bitstream.

8. The method of claim 1, wherein the adjusting of the first UCI bitstream involves performing an upper ceiling operation.

9. The method of claim 1, wherein the modulation scheme is Binary Phase Shift Keying (BPSK), Quadrature Phase Shift Keying (QPSK), or Quadrature Amplitude Modulation (QAM).

10. A User Equipment (UE), comprising:
    an encoder that encodes uplink control information (UCI) in a new radio (NR) network, wherein the UCI is encoded to have a first UCI bitstream having a first UCI codeword size and a second UCI bitstream having a second UCI codeword size;
    a config and control circuit that adjusts the first UCI bitstream such that the first UCI codeword size is a multiple of a modulation order;
    a modulator that modulates and maps the adjusted first UCI bitstream using a modulation scheme having the modulation order onto a plurality of resource elements (REs); and
    a transmitter that transmits the UCI over a physical uplink control channel (PUCCH).

11. The UE of claim 10, wherein the first UCI bitstream comprises a first part of channel state information (CSI) information.

12. The UE of claim 10, wherein the second UCI bitstream comprises a second part of channel state information (CSI) information.

13. The UE of claim 10, where the first UCI bitstream and the second UCI bitstream are modulated and mapped separately and independently.

14. The UE of claim 10, wherein the first UCI codeword size and the second UCI codeword size add up a predefined total size for the PUCCH channel.

15. The UE of claim 10, wherein the adjusting of the first UCI bitstream is to ensure an integer number of modulation symbols for the first UCI bitstream.

16. The UE of claim 10, wherein the adjusting of the first UCI bitstream is to enable parallel processing between the first UCI bitstream and the second UCI bitstream.

17. The UE of claim 10, wherein the adjusting of the first UCI bitstream involves performing an upper ceiling operation.

18. The UE of claim 10, wherein the modulation scheme is Binary Phase Shift Keying (BPSK), Quadrature Phase Shift Keying (QPSK), or Quadrature Amplitude Modulation (QAM).

* * * * *